…

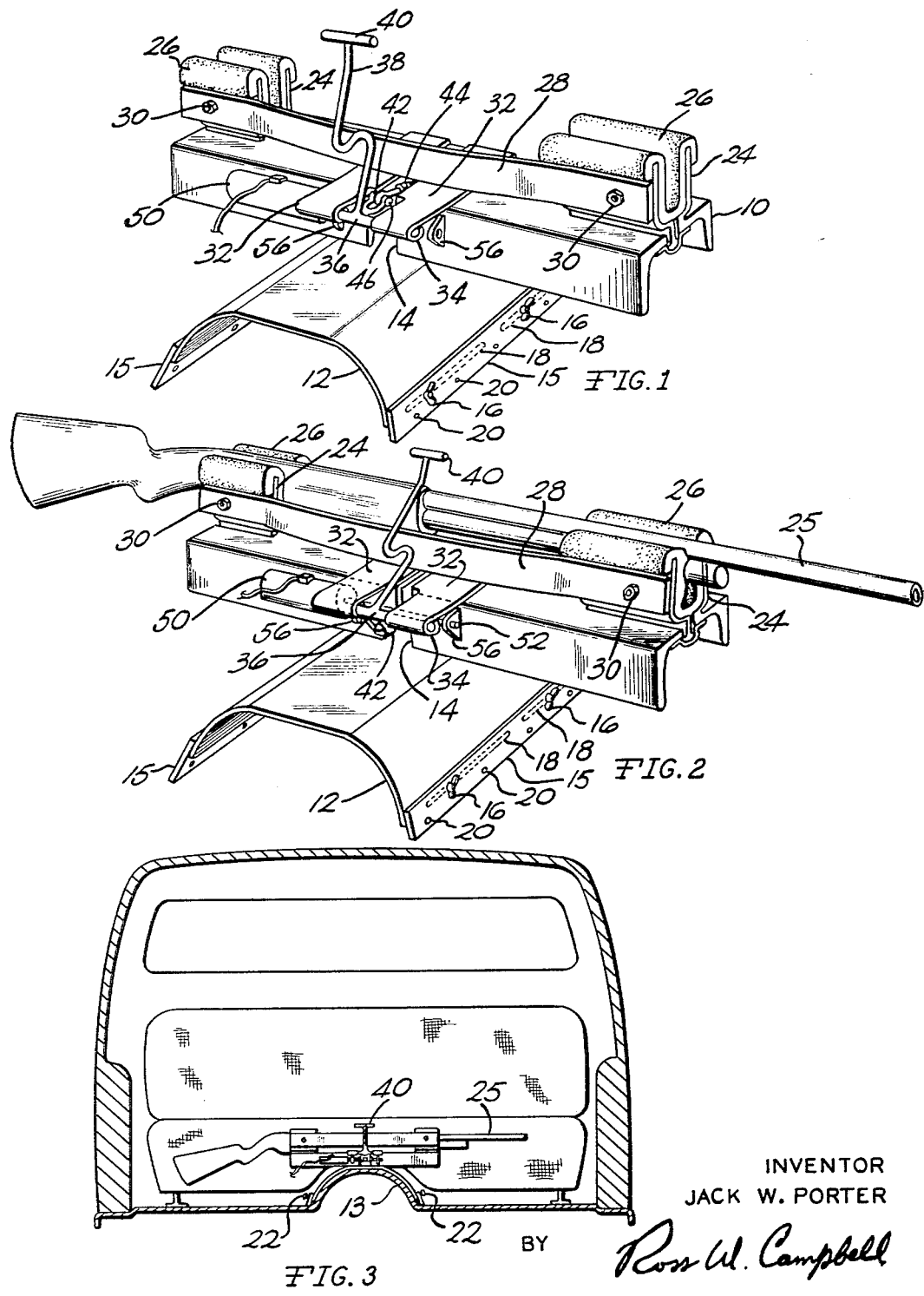
INVENTOR
JACK W. PORTER

United States Patent Office 3,473,673
Patented Oct. 21, 1969

3,473,673
MOBILE GUN RACK
Jack W. Porter, 5304 Durwood Drive,
Swartz Creek, Mich. 48473
Filed Oct. 9, 1967, Ser. No. 673,660
Int. Cl. A47f 7/00, 5/00
U.S. Cl. 211—64           3 Claims

ABSTRACT OF THE DISCLOSURE

A gun rack, adapted to support a rifle or shotgun within a vehicle. A pair of U-shaped brackets are supported upon an elongated base member. A leaf spring extends between said brackets and is secured near its opposite ends to the outside of a pair of corresponding arms of the brackets. A leaf spring yieldingly urges the brackets to assume their closed positions when the spring is compressed, and permits the brackets to assume their open positions when the spring is not compressed. A cam member is rotatably supported upon the base member and is arranged to selectively compress and release the leaf spring. Spring means biases the cam member toward a position in which it releases the leaf spring. Support means is provided for mounting the base member upon the floor of a vehicle, immediately in front of a seat thereof, and to permit forward and backward adjustment of the device to accommodate such adjustment of the vehicle seat.

CROSS-REFERENCES TO RELATED APPLICATIONS

None.

BACKGROUND OF THE INVENTION

Field of the invention

The present invention relates to gun racks, and more particularly to a gun rack adapted to be mounted within a vehicle and arranged to releasably clamp a rifle or shotgun in a horizontal position forwardly and below a seat of the vehicle.

Description of the prior art

Heretofore, gun racks utilized to support rifles or shotguns in vehicles have relied upon untensioned bracket means, or upon spring tension applied to the firearm by clamping members alone for retaining the firearm. In the case of the latter devices, no means was available for locking the firearm to the rack, so as to prevent theft, and the necessity of releasing the firearm from two separate clamping members delayed the release of the firearm from the rack in cases of emergency. In the former case, the absence of constant tension between the rack and firearm resulted in movement of the firearm within the rack and consequent chafing of and damage to the firearm as a result of movement of the vehicle, particularly when driven over rough roads.

SUMMARY

It is accordingly an object of the invention to provide an improved vehicle gun rack having single means for securing and releasing a firearm under positive tension therein. A further object of the invention is to provide an improved vehicle gun rack having means for rapidly locking and unlocking a gun within the rack. Still further object of the invention is to provide a vehicle gun rack having improved means for being mounted within a vehicle.

BRIEF DESCRIPTION OF THE DRAWING

FIGURE 1 is a perspective view from the rear of my vehicle gun rack, showing same in unlatched position.

FIGURE 2 is a similar view of my invention in latched position with a firearm secured therein.

FIGURE 3 is a transverse sectional view of an automobile passenger compartment showing my invention mounted upon the driveshaft housing immediately forwardly of a seat of the vehicle.

DESCRIPTION OF THE PREFERRED EMBODIMENT

Referring now more particularly to the drawings, in which like characters are employed to designate like parts throughout the same. I provide an elongated base member 10, preferably formed of a channel iron or the like, welded or otherwise secured by conventional means to an inverted, curved support member 12, having a configuration conforming to that of a housing 13 covering the driveshaft of a motor vehicle. A portion of base member 10 is cut out to form an aperture 14 for a purpose hereinafter described. An elongated mounting bracket 15 is adjustably supported upon support member 12 by a plurality of wing nuts 16 extending through elongated slots 18 formed in support member 12 near one edge thereof. A plurality of apertures 20 are provided in bracket 15 to receive self-threading sheet metal screws 22 whereby to affix the bracket to driveshaft housing 13.

A pair of U-shaped brackets 24, 24 are supported upon base member 10 near opposite ends thereof. Brackets 24, 24 are preferably formed of resilient material, such as spring steel, enabling their legs to be closed by external pressure and, when released, to again assume an open position. The inner and upper surfaces of brackets 24, 24 are covered with foam rubber padding 26 or the like, to prevent scarring of a firearm placed therein. An elongated leaf spring 28 is secured by nut and bolt combinations 30, 30 or the like to the outside of a pair of corresponding legs of brackets 24, 24 and extending therebetween. Leaf spring 28 is arranged to yieldingly urge said corresponding legs toward the opposing legs of brackets 24, 24, clamping a firearm 25 therein, when the spring is compressed, and to permit the legs to reassume their open positions when the spring is no longer compressed.

A pair of metal plates 32, 32 are welded to the upper surface of base member 10 in space, mutually parallel position, transverse to the longitudinal axis of the base member, near the center thereof, and extending outwardly from the edge thereof. The outwardly extended edges of the plate 32, 32 are curled under to form pintles 34 pivotally supporting the ends of a trunnion member 36 borne at the fulcrum point of a bell-crank type cam member 38 having a handle 40 at its upper end and a clevis 42 at its lower end. One end of a tension spring 44 is secured to clevis 42 by the pin 46 of the clevis and the other end extends through aperture 14 and is anchored to the opposite underside of base member 10, so as to exert tension upon the clevis and cam number 38.

It should be particularly noted that the configuration of the long arm of cam member 38 enables it to serve as a cam with respect to leaf spring 28 whereby, when handle 40 is forced forwardly and downward, the cam member contacts and forces base spring 28 forwardly, compressing it and applying the spring tension thereof against the corresponding legs of brackets 24, 24 which support the spring, whereby said legs are yieldingly urged toward the opposing legs of brackets 24, 24 gripping firearm 25, as best shown in FIGURE 2. When handle 40 is drawn upwardly and rearwardly, cam member 38 is disengaged from leaf spring 28, permitting the leaf spring to release its pressure upon the legs of brackets 44, 44 which support it and allowing the legs to reassume their open positions, so that firearm 25 may be easily removed therefrom.

I also provide a unique and novel means for positively locking my improved vehicle gun rack when firearm 25 is secured therein. As best shown in FIGURES 1 and 2, a solenoid 50 is mounted upon the rear side of base member 10 and is electrically connected into the ignition circuit of the motor vehicle so as to be actuated when the ignition is turned on and to be deactivated when the ignition is turned off. When the ignition switch of the vehicle is turned on, the solenoid plunger 52 is withdrawn into the solenoid proper, as best shown in FIGURE 1, and cam member 38 may be rotated to release leaf spring 28 as hereinbefore described. When, however, the ignition switch of the vehicle is turned off, solenoid plunger 52 is urged forwardly by the internal spring of the solenoid and assumes its position of rest, extended above clevis 42, below the upper arm of cam member 38, and through apertures 54 in a pair of brackets 56, 56 welded or otherwise secured to base member 10, thereby blocking clevis 42 from upward movement and preventing the cam member from being disengaged with leaf spring 28. The gun rack is thus automatically locked whenever the ignition of the vehicle is turned off, so that a police officer operating the vehicle will be automatically locking firearm 48 within the gun rack whenever he turns off the ignition preparatory to leaving the vehicle. This prevents theft of the firearm while the officer is absent from the vehicle, and permits the officer to unlock the gun rack for purpose of removing the firearm by simply turning on the ignition switch of the vehicle.

It should be particularly noted that base member 12 may be shifted forwardly and rearwardly with respect to bracket 20 and hence with respect to driveshaft housing 13 of the vehicle by simply unloosening wing nuts 16, moving support member 12 and base member 10 forwardly or rearwardly to the desired position, and then tightening the wing nuts. The conventional front seat of the automobile may thus be adjusted to accommodate any size of rider and the gun rack can always be positioned immediately forward of the vehicle seat, below the legs of the rider, as best shown in FIGURE 3.

While for purposes of illustration I have shown and described a preferred embodiment of my invention mounted within an automobile, it is to be understood that it is not restricted to use with an automobile or other motor vehicle and may be mounted upon or within any mobile article or device, whether self-propelled by any means or otherwise.

What is claimed is:
1. An elongated base member,
   a pair of U-shaped brackets having resilient legs and supported upon said base near opposite ends thereof,
   a leaf spring supported at its ends by a pair of corresponding legs of said brackets and arranged to yieldingly urge said corresponding legs of said brackets toward the opposing legs thereof when said leaf spring is compressed,
   a cam member pivotally supported upon said base member and arranged to selectively compress and release said leaf spring,
   and a support member for supporting said base member.
2. The device of claim 1 having spring means arranged to yieldingly urge said cam member to release said leaf spring.
3. The device of claim 1 having lock means arranged to releasably retain said cam member in a position compressing said leaf spring.

References Cited
UNITED STATES PATENTS

| | | | |
|---|---|---|---|
| 2,316,995 | 4/1943 | Smith | 211—64 X |
| 2,607,517 | 8/1952 | Crockett | 223—96 |
| 2,632,619 | 3/1953 | Wilson | 248—316 |
| 2,692,069 | 10/1954 | Winters | 211—64 X |
| 3,326,385 | 6/1967 | Pinkerton | 211—64 X |

CHANCELLOR R. HARRIS, Primary Examiner

U.S. Cl. X.R.
248—201, 316